(12) United States Patent
Wang et al.

(10) Patent No.: US 7,597,262 B2
(45) Date of Patent: Oct. 6, 2009

(54) TWO DIMENSIONAL (2D) CODE AND CODE SIZE INDICATION METHOD

(75) Inventors: Hao Wang, Beijing Feng Tai (CN); Yanming Zou, Beijing (CN); Jari Kangas, Tampere (FI)

(73) Assignee: Nokia Corporation, Espoo (FI)

( * ) Notice: Subject to any disclaimer, the term of this patent is extended or adjusted under 35 U.S.C. 154(b) by 645 days.

(21) Appl. No.: 11/180,293

(22) Filed: Jul. 13, 2005

(65) Prior Publication Data

US 2007/0013767 A1    Jan. 18, 2007

(51) Int. Cl.
*G06K 9/18* (2006.01)

(52) U.S. Cl. ............... 235/462.09; 235/462.01; 235/462.25

(58) Field of Classification Search ........... 235/462.01, 235/462.09, 462.1, 462.25, 472.01; 382/203
See application file for complete search history.

(56) References Cited

U.S. PATENT DOCUMENTS

| 6,786,412 B2 * | 9/2004 | Shimizu | 235/462.25 |
| 6,863,218 B2 * | 3/2005 | Muramatsu | 235/462.25 |

* cited by examiner

*Primary Examiner*—Seung H Lee
(74) *Attorney, Agent, or Firm*—Foley & Lardner LLP

(57) ABSTRACT

Mobile communication or computing devices, and methods and systems for the operation of mobile communication devices; each involving a binary code in square form which has been encoded with binary data arrayed within the square form, whereby the code in square form includes at least one border not including binary data, but including code size indication data in the form of a repetitive sequence.

43 Claims, 6 Drawing Sheets

(a) n=3k

1 Byte more

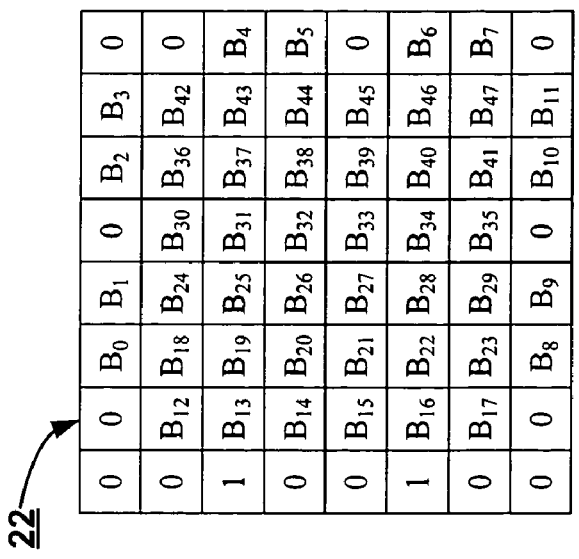
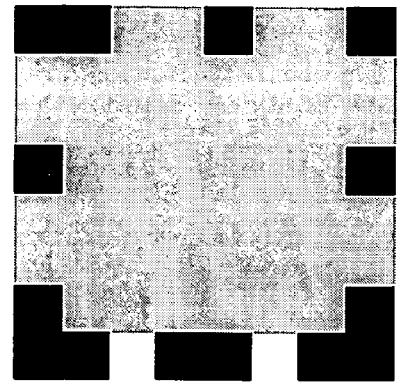
(c) n=3k+2
FIG. 2C
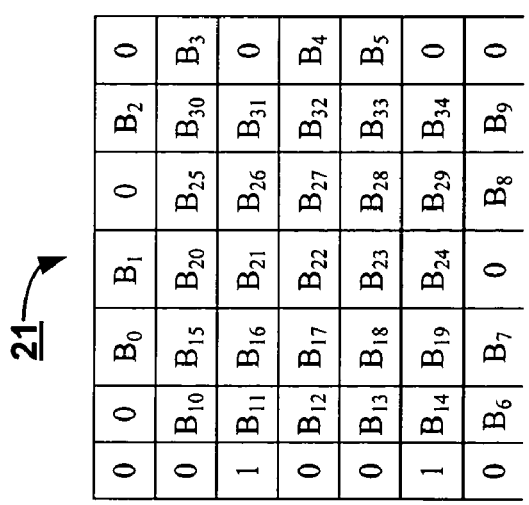
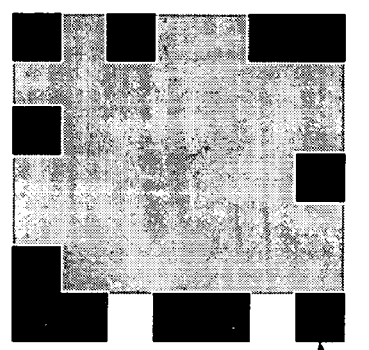
(b) n=3k+1
FIG. 2B
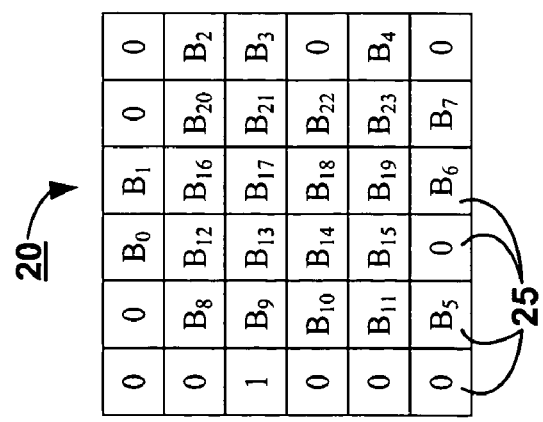
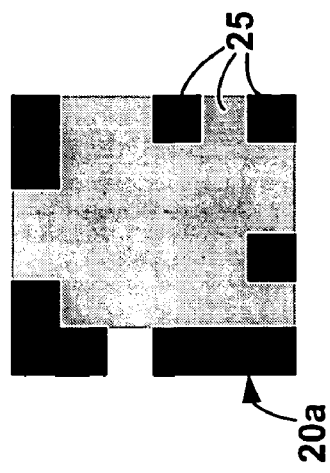
(a) n=3k
FIG. 2A

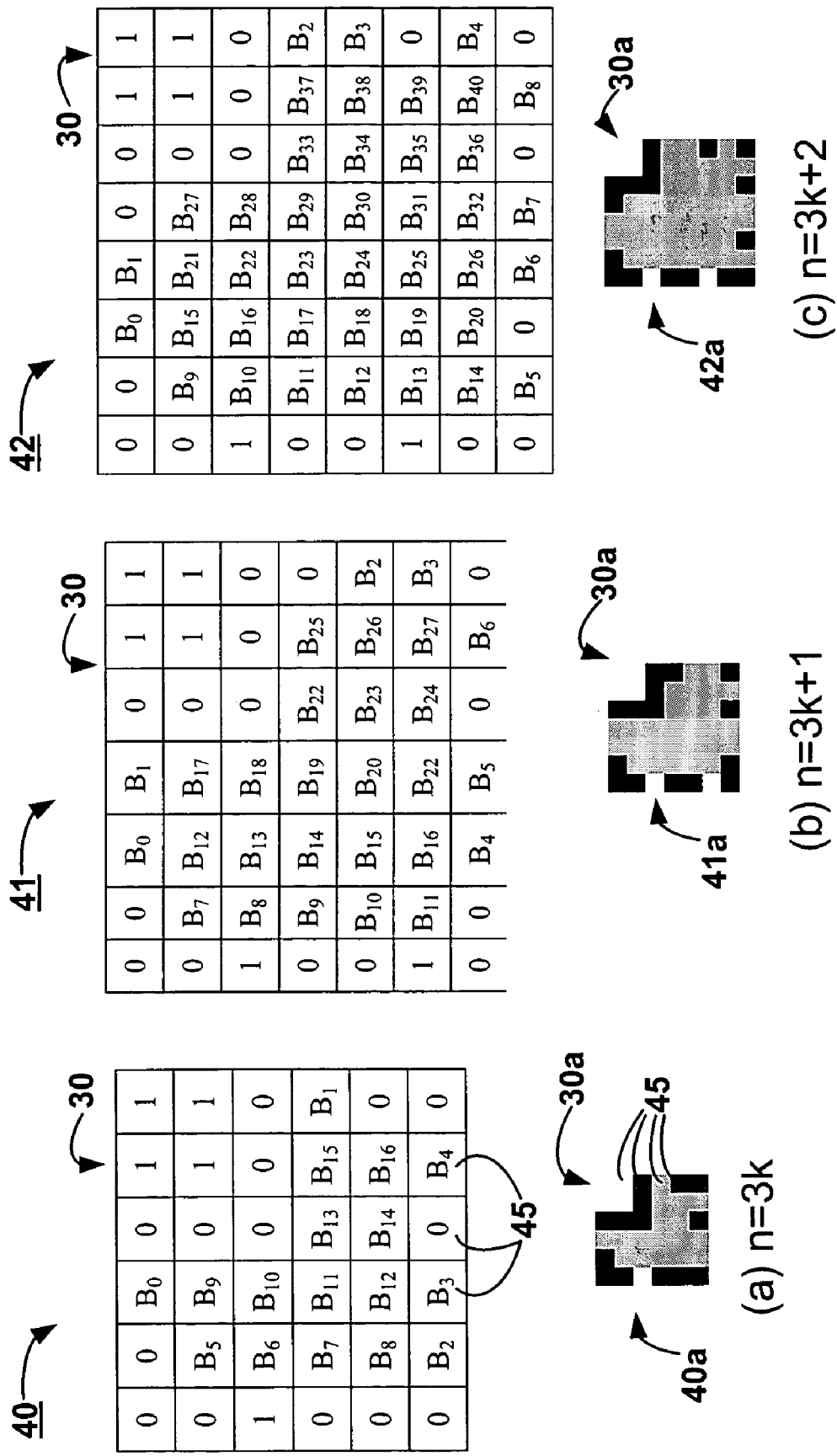

TWO DIMENSIONAL (2D) CODE AND CODE SIZE INDICATION METHOD

This invention relates to improved code formation, as well as to scanning, reading and/or decoding options particularly useful with portable communication devices, and more particularly for use with cameras of portable communication devices.

BACKGROUND

Personal portable communication apparatuses in the form of mobile or cellular telephones have become extremely popular and are in widespread use throughout the world. Moreover, mobile telephones have evolved from just portable analogues of traditional fixed-line telephones, no longer providing only voice communication, rather now having been developed into multi-faceted communication and alternative function devices providing a large range of communication and operability options including wide area network (e.g., internet) access as well as other functionalities such as numerous camera and/or scanning capabilities, inter alia. Indeed, mobile camera phones are in actuality computers with operably incorporated cameras disposed therewithin.

Input and/or output (I/O) of data into and/or out from mobile camera phones or like portable computing devices may take many forms. For an example particularly relevant hereto, data may be set in a printed pattern (e.g., a bar code) and can then be readable by the camera portion of a mobile camera phone to accelerate a data input operation. The camera can thus be a kind of two-dimensional (herein, also 2D) sensor; indeed, data patterns with 2D forms have been preferable. Even so, existing 2D codes, such as Data Matrix, QR code, MaxiCode, Axtec Code (these listed four being International Symbology Specification standards), etc., are designed for scanner-computer usage. Directly applying these codes to mobile camera phones is not practically feasible at least for current camera phone hardware. Existing 2D code standards are not specific for camera readable requirements. The code finder and size indication methods used in existing code standards normally require high resolution of scanning images. Current camera phones in the market cannot obtain that kind of resolution.

Rather, although the scanning of 2D codes representing digital data is well known, laser scanners have been traditionally used for such purposes. Compared with the abilities of such laser scanners, the images of 2D code taken by a conventional mobile phone camera are not usually of equivalent quality. For example, the mobile phone camera may produce relatively lower resolution and with much noise, and/or, the size of the images may be limited, the quality of the images may be poor since the 2D code in the images may be blurred and deformed caused by the too short distance photo-capture and perspective. The basic requirements of visual code size are as follows: The visual code size should grow proportionally with the amount of the data (in contrast to the Data Matrix modules as shown in FIG. 1, see discussion hereof below); meaning that there should be no sudden "jumps" in code size, and, instead the size should grow linearly with the data. Also, the code should be easy to detect and read independently of the size and amount of data in the code.

Thus the design of the code itself including the border, and the size indication (and the actual data encodation) as well then as of the code finder and reader should be robust for low quality images. Mobile phones with cameras may then be easily and reliably used to read such a code.

Note further that at least one other party is advertising products and/or software (SW) applications for the creation of codes and the decoding thereof by using a camera phone, see for example http://www.highenergymagic.com/.

Code reading capabilities are thus valuable to facilitate the usage of mobile services such as those which are available with mobile communication devices like mobile camera phones. Therefore, it is advantageous to develop code technologies better suited to the cameras of mobile camera phones.

SUMMARY

According to a first aspect of the invention there is provided a method of or system for operation of a mobile computing device; the method including use of a binary code in square form which has been encoded with binary data arrayed within the square form, whereby the code in square form includes at least one border not including binary data, but including code size indication data in the form of a repetitive sequence.

According to another aspect, a binary code in square form is provided which will be encoded with binary data arrayed within the square form, whereby the code in square form includes at least one border not including binary data, but including code size indication data in the form of a repetitive sequence.

Also included is a method of formation of a binary data code in square form; the method comprising: establishing the four corners of the code by providing four square corners in contrasting dark form; creating at least one size indicative border between two of said four corners the border not including binary data, but including code size indication data in the form of a repetitive sequence; filling in the remaining borders with binary data; and, encoding the interior of the square form with binary data arrayed within the square form.

According to a still further aspect, mobile communication devices hereof include a housing with a camera disposed in the housing; control software disposed within the housing of the mobile computing device, the control software including rules for reading a binary code viewed by the camera of the mobile computing device; whereby the rules for reading a binary code which has been encoded with binary data arrayed within a square form, whereby the code in square form includes at least one border not including binary data, but includes code size indication data in the form of a repetitive sequence.

BRIEF DESCRIPTION OF THE DRAWINGS

For a better understanding of the present invention and to understand how the same may be brought into effect, reference will now be made, by way of example only, to the accompanying drawings, in which:

FIG. 1, which includes the sub-part

FIG. 2, which includes the sub-part FIGS. 2A, 2B and 2C, presents a code module placement and size indication scheme according hereto.

FIG. 3, which includes the sub-part

FIG. 4, which includes the sub-part FIGS. 4A, 4B and 4C, presents a code module placement and size indication scheme that also provides an indication of orientation.

DETAILED DESCRIPTION OF THE INVENTION

In order to speed data input and/or to activate new applications, novel technologies are desired for input and/or output in many software and hardware arenas, but also particularly as described herein, for mobile communication or computing devices such as mobile camera phones. Thus, developed here is a novel visual code pattern, which may be used with and by mobile camera phones, inter alia. This invention sets forth a two dimensional (2D) coding scheme and includes a size indication method of such a 2D code that is suitable for camera phone decoding.

Figure 1B:
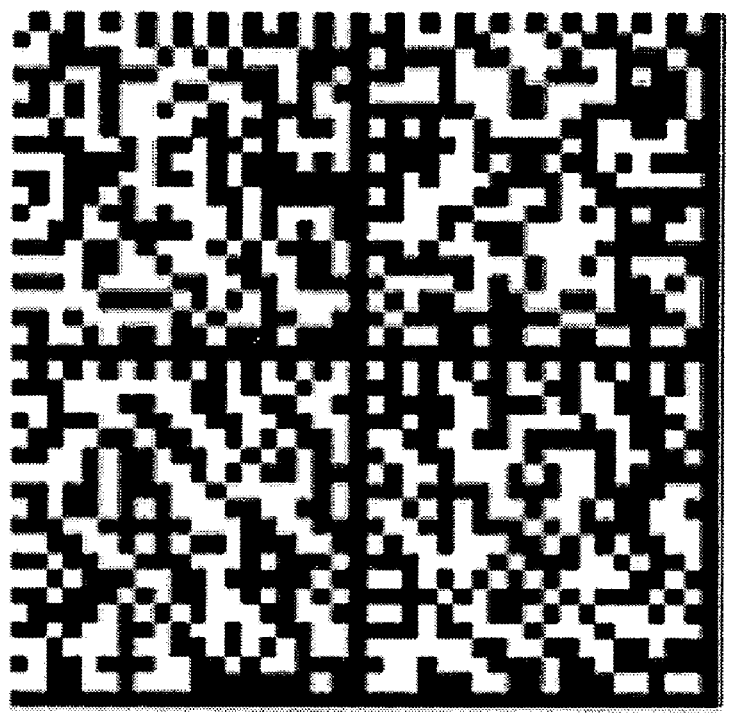
FIGS. 1A and 1B, presents an example of the non-proportionality of code size found in a prior art code scheme.
Figure 1A:
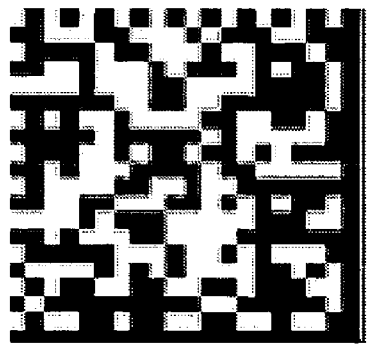

FIG. 1 shows a prior art example using a Data Matrix coding scheme where the growth of code size is not proportional to the increase in data to be encoded. More particularly what is shown is that a first code, identified by the reference numeral 10 in FIG. 1A, contains a first quantity of data bits, but then, in FIG. 1B, a second code 11 is shown of a size necessary to include any more encoded data, e.g., even just one more byte (8 bits). Nevertheless, the second code 11 is four times as large as the first code 10 even though it may only be intended to hold merely eight (8) more bits (i.e., one byte) of data. In this prior art case, this is necessary in order to retain a square-shaped code with coincidental retention of the Data Matrix-inherent size indication and orientation schemes. As will be shown hereinbelow, non-proportional growth, particularly at these types of scales (4 times the size for the inclusion of any additional matter) will be avoided or at least lessened by the present invention.

The present invention rather provides what may be simply used as a low-level encoding scheme for a camera readable visual code that is easily and reliably readable and robust for application environments using current mobile camera phone models (such as the Series 60 cameras available from Nokia Corporation, Espoo, Finland, amongst other portable phone or computing device models by this or other manufacturers). As described in detail herein, this new scheme provides a simple code size indication method which can omit code finder patterns and also supports linear or otherwise substantially proportional growth of code size relative to the data quantity to be encoded.

FIG. 2 presents a size indication and module placement scheme according to the present invention. As in some other encoding schemes, bits are encoded one bit per module or cell, the modules or cells each presenting either a black or a white (or other contrasting colour) space in the overall code, the black or white colours being correspondingly representative of the zero (0) or one (1) of the corresponding data bit represented thereby. In the example here, black corresponds by non-limitative convention to a bit having a zero value and white to a bit having a value of one. See the representative modules or cells 25 in the code 20a of FIG. 2A (resulting from the human readable code form 20 also of FIG. 2A). Similar modules or cells are disposed in and make up the other codes 21a and 22a of respective FIGS. 2B and 2C as well (similarly resulting from the human-readable code forms 21 and 22 also depicted in FIGS. 2B and 2C).

In the present example, the code 20 (and each of codes 21 and 22) is preferably established in a two-dimensional (2D) square form; see also the resultant code form(s) 20a (and 21a and 22a). Further, the basic shape of each module or cell is also preferably square and all are of equal size, see modules or cells 25 of code 20/20a (note, the modules or cells will be alternately referred to as either modules or cells without distinction hereafter). Thus, the whole code may then be made of an array of equally sized and shaped modules, here having the geometric properties of small squares making larger square codes. The number of modules in any one column or row of the square is defined as the size of the code, noted as "n" in the following description. Thus, the square code has n columns and n rows.

To assist the description, some non-limitative conventions will be used herein, e.g., the columns in a code may be counted from left to right, starting from 0 and ending with n−1. The rows may then be counted from top to bottom, from 0 to n−1. So for a module located at the x column and y row, it can be referenced as module (x,y). Note, other counting and/or orientation conventions may also and/or alternatively be used within the scope of the present invention; the current ones being used here for convenience only. For example, counting could alternatively be established right to left, bottom to top or otherwise depending upon spatial orientation, inter alia. Similarly, counting could start at 1 (or another desired number) and proceed to n (or another endpoint number, n+1, etc.), and x and y could be substituted with or by other variables.

The border or exterior modules of the code may be used for one or more purposes as for example, to define or indicate the position of a code. In one set of preferred embodiments, the four corners may all be made black in colour (or some other dark heavily contrasting colour). In many embodiments also it may be preferred to make at least about one third or more than one third of the modules in the borders black (or another heavily contrasting colour) as well. Either or preferably both of these together can provide an accurate position definition or indication of a code with the present encoding/decoding method (i.e., having a minimum (such as one-third) of the border cells black ensures sufficient definition of a border for computer/camera recognition).

Then, a preferred method of encoding a code, i.e., a scheme for Placement of Modules or cells in a square may include placement steps such as as follows:

First, as mentioned, the four corners of the square may be established as 0 or 'black' constantly. Only 4*(n−2) modules will then be left in the four borders. Second, the first column, i.e., column 0, may be used to indicate the size of the square. A substantially repetitive bit stream such as "01001001001 . . . ," which may be shorter or longer depending upon the value of n, may be written to the border column from cell (0, 1) to cell (0, n−2). Note the repetitive three part cycle of the "010" (not including the corner) repetitively added at either end of this exemplar bit stream. Then, in decoding a code made according hereto, the positions of the black to white and white to black edges can be obtained from the image, thus the size of one module can be determined (e.g., measured and calculated or at least estimated) and then the size of the entire code square can be calculated. The repetitive form of the code sequence (two blacks to one white) yields the comparative basis for this determination. Third, the first 2*(n−2) bits of the data set to be encoded may be recorded in the other three borders of the square. In a preferred set of embodiments, particularly where it may be desirable to establish at least one third of the border modules or cells as black (or another dark contrasting colour), a '0' bit may be inserted before (and/or after) each 2 continuous bits, thus a stream of 3*(n−2) bits may be obtained such as "000** . . . " (where the *'s represent open cells or modules to be filled in by the actual bit stream data to be encoded thereafter). This disposition of '0' bits before every two open modules is continuous around the remaining three border legs; first across the top row, continuing down the right-side border column and finishing left to right on the bottom row. Then, a data bit stream to be encoded may be written to the code starting with the open cells or modules left in the three (3) borders in order as:

The top border from the cell (1,0) to the cell (n−2,0);
The right border from the cell (n−1,1) to the cell (n−1,n−2);
The bottom border from the cell (1,n−1) to the cell (n−2, n−1)

Fourth and finally, other subsequent bit stream data may then be written bit by bit to the inside (n−2)*(n−2) modules, column by column in a particular desirable order, as by the convention here, from left to right. In each column, again, by the present convention, this data may be written from top to bottom, though other orientations or conventions could alternatively be used for either or both directions of bit encoding.

For this placement method, three examples are shown in FIG. 2, with three different values of n (n=6 in FIG. 2A; n=7 in FIG. 2B; and n=8 in FIG. 2C). More particularly, what is shown in FIG. 2 (including each of FIGS. 2A, 2B and 2C), is that according to the first step, the corners are shown as 0 in the human readable versions 20, 21 and 22 of the codes and as black in the actual code forms 20a, 21a and 22a. Then, according to the second step, the left most columns of each of the human readable versions are filled top to bottom with a variant of the repeating and expanding code "0100100100 . . . "; noting however that in FIG. 2A, this left/first column code is only 0100 as the corners do not play a part in this step; and then, in FIG. 2B, this code is 01001 and in FIG. 2C, it expands to 010010. Next, also shown in FIG. 2, according to the third step, the other borders are filled in according to the "000**0 . . . " expanding form described above, each of the *'s being left open to be filled by the next part of this step; with actual data bits (note, the cycle of three 0** repeating also in this bit stream encodation). More particularly, as shown in FIG. 2, the top border is filled first with a 0 in the second column (top row), then continuing left to right, two open modules (or *'s) are left in the next two columns (still in the top row), then a second 0 is placed in the fifth column (top row). This pattern is the same for all three examples of FIG. 2. In any of these cases, then the pattern continues uninterruptedly, whether into the far right column going downward as in FIG. 2A (with two open or "*" modules then a 0 etc.), or whether continuing further along the top row as in FIGS. 2B and 2C, before then continuing downward in the right-side border column. Note, the gray color in the codes 20a, 21a and 22a of FIG. 2 means that each of those modules is left open and can thus take either a 1 or 0 (white or black) from the actual data bit stream to be encoded/entered in step four. Similarly, the symbol $B_j$ is a variable which represents the jth bit in the data bit stream to be entered as described below. Note first before leaving step three that according to the conventions used thusfar, the "000**0 . . . " filling of the border cells continues without discontinuity first left to right on the top row, then continues top to bottom on the right hand border column and continues further left to right in the bottom row starting once again with the second column, bottom row, and proceeding to the right up to the corner where it ends. This third step ensures the at least one-third of the borders being darkened to give boundary definition and position indication.

Then, according to the fourth step, as shown in FIG. 2, the remaining open border modules (the *'d modules left open in step 3) may be filled in with the actual data bits of the data bit stream to be encoded. The codes 20a, 21a and 22a have been left grayed out for this step; however the human-readable forms 20, 21 and 22 have been filled with $B_j$ variables to indicate the data fill progression. Again, first the open border positions are filled, top row left to right, then right side border column, top to bottom and then bottom row, left to right. Namely, the $B_0$ and $B_1$ data bits (the first two bits of the bit stream to be encoded) are shown disposed in the top row, third and fourth columns (also indicated in x,y format as the (0,3) and (0,4) cells). This is the same for all three examples in FIG. 2. Then however, in the example of FIG. 2A, there are no more open cells or modules available in the top row, so $B_2$, $B_3$ and $B_4$ must then be filled, top to bottom, in the open cells of the right-side border column as shown. By contrast, the FIG. 2B example has a further open cell for the $B_2$ data bit, and the FIG. 2C example has room for both the $B_2$ and $B_3$ data bits. Border filling then continues to the bottom of the right-side border column and then continues, left to right, in the bottom row filling the open cells there. In FIG. 2A, this is shown by the $B_5$, $B_6$ and $B_7$ data bits. In FIGS. 2B and 2C, four data bits each have been filled in ($B_6$, $B_7$, $B_8$ and $B_9$ in FIGS. 2B and $B_8$, $B_9$, $B_{10}$ and $B_{11}$ in FIG. 2C). The remainders of the bitstreams are then filled into the interior cells as shown in the human-readable codes 20, 21, and 22 of FIG. 2 starting at the second row (from the top) of the second column (from the left), filling according to the present convention top to bottom then column to column, left to right.

Note, these steps need not necessarily be taken in order. For example, the filling of the borders with "000" and the filling of the otherwise open * modules with actual bit stream data may occur substantially simultaneously so long as the definition of the appropriate locations for the corresponding data bits is retained. Similarly, so long as the corners and the left side column are left for the appropriate filling of respective colours (black corners and the two black then one white, etc. sequence), creation of these modules in the actual code may be performed after the data fill and/or the border creation.

A further note is that a second variable "k" may be introduced in and provide further assistance in the description and/or utilization of codes according to the hereof. This "k" value can be used in equations to identify separate classifications of codes or at least the borders thereof. The value of "k" itself does not define nor separate the classifications; rather, the resulting equations including a "k" variable (with any value) identify the separate classifications.

This can be shown best by reference to the examples of FIG. 2. As is shown in the examples of FIG. 2, a value of k has been arbitrarily set to equal 2 (k=2). However, the three subpart FIGS. 2A, 2B and 2C reflect three different classifications of codes encoded according to the methods hereof. These classifications are best separately identified by the equations: (a) n=3k; (b) n=3k+1 and (c) n=3k+2. The result of or the difference between codes of the discrete classifications is that the borders of any particular codes within the same classification differ only by the addition (or subtraction) of any integer value of the repetitive bit stream used to define that border. Then, the borders of one classification always differ from the borders of another classification by the same distinction measurable as a function of the same repetitive pattern.

For a more specific example, when viewing differences in discrete classifications relative to the left border: for the first exemplar classification, i.e., when n=3k (see FIG. 2A), if k=2 (as shown), then the left border is 001000, and further if k=3, this border becomes 001001000, and if k=4, then this border is 001001001000, and so on for other values of k (note, the corners have been included in these examples). The result is a repetitive pattern which differs only be the inclusion of a 010 within the interior of the pattern (as at the beginning after the corner); but note the distinctiveness, particularly where the last three cells are always 000. Thus, with this distinctiveness, when n=3k, an easily/quickly recognizable pattern emerges.

However, when comparing to the other classifications, as for example according to the second classification, when n=3k+1 (see FIG. 2B), if k=2, the left border is 0010010 (as shown), and further if k=3, then this border is 0010010010, and if k=4, then it is 0010010010010, and so on for other values of k. Note, a very distinctive pattern is shown, here particularly as the last three cells always present a 010. Moreover, for the third classification, i.e., where n=3k+2, and when k=2, the border is 00100100, and when k=3, the border is 00100100100, and when k=4, it is 00100100100100, and so on. The last three cells in this third classification are always 100.

Thus, within each classification a pattern emerges (with only an additional integer value (represented by the k) of the three part cell pattern, e.g. 010, added or subtracted); and, moreover, a quickly identifiable distinction between classifications can be found, particularly here in those last three cells (e.g., where class (a) has 000; class (b) has 010 and class (c) has 100). This can then simplify the code size recognition functionality of the decoding software and/or hardware. The classification can be determined and then the k value thereafter found, perhaps more simply than merely counting the n value. Note further that some similar (though not the same) patterns will be apparent in the other three borders as well.

It should also be noted for these examples of separate classifications that the use of the "3" value in the equations is a direct result of the optional, though preferred selection of a repetitive border patterns including three part cycles (e.g., 010 or 0**). As a result, all the possible lengths of such a code may be divided into the three classifications; namely, n=3k; n=3k+1 and n=3k+2. The definition of each classification may thus be viewed as dependent on the remainder (+0; +1 or +2) when the length, n, of the code is divided by 3. Thus, k is the integer part of the quotient (n/3). However, it should be noted that other divisors could be used, particularly if the methods for filling the borders including the method of indicating the length of the code are determined to have other patterns, as are possible within the present invention. Repetitive patterns using cycles of two or four or five or more cell patterns are available, and if used these would then change the numbers of classifications which would result. Classification definitions of such could then be generalized according to the equation: n=zk+R; where n is the size of the column or row of the square (as above), and k is the integer value as before, and then z is the number of elements in the discrete border cell cycle (3 in the above examples) and R is the remainder defining the discrete classifications (+0, +1, +2 . . . up to +(z−1)).

As one further note on the examples of FIG. 2, the scheme for encodation described relative to FIG. 2 as a whole provides a code without an indication of orientation (upright or downside up or having rotation), unless this patterning at the end of the left hand column can be sufficiently distinctive. Thus, an alternative second method to place modules in a code may be used depending on whether the orientation of the code is needed or desired to be indicated by the code itself. For a code with an orientation indication, a module or cell placement scheme may be as follows:

First, one of the corners of the otherwise square code can be depicted in other than a standard black (or otherwise dark contrast) while the other three corners of the square are set to 0 or 'black' constantly. Thus, the chosen corner may be set to 1 or white. Even more robust would be a depiction of the chosen corner as being significantly white as where the four cells or modules in that corner are made 1's or white; and optionally further, the surrounding cells or modules in the main code portion may each be made 0's or black to emphasize the distinction. An example of this is shown in FIG. 3 where the upper right corner is chosen such that the three rightmost cells of the three rows 0, 1, 2 are used to indicate the orientation of the code. These cells are then set as shown in FIG. 3 with the two right most cells of the top two rows being set as 1's and thus white and the next inner cells (the third column from the right and the third row) being made 0's and thus black. FIG. 3A gives the human readable version 30 of the code with cells 35*a* being made 1's and cells 35*b* being set as 0's.

Figure 3B:
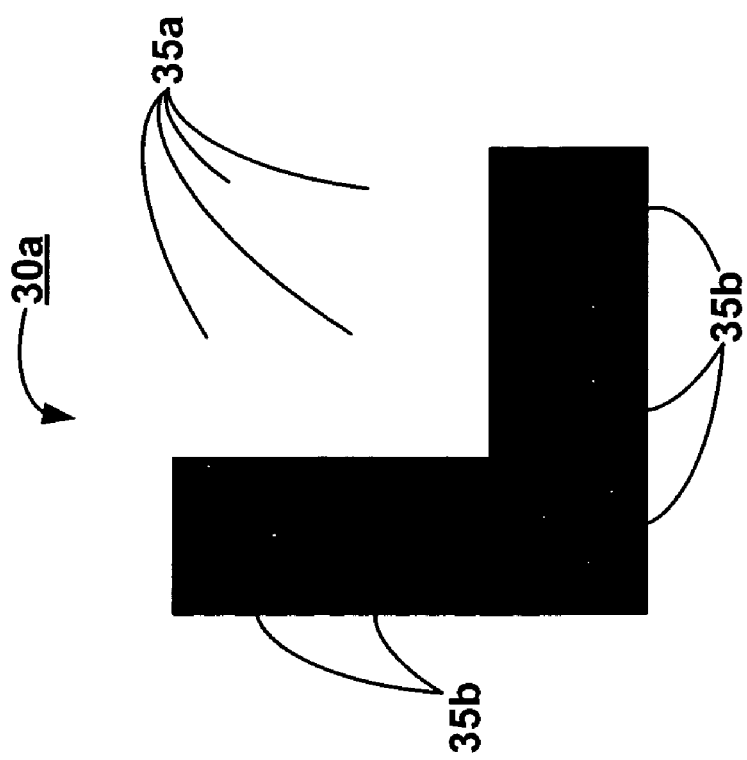
FIGS. 3A and 3B, presents a part of a code showing code module placement for orientation indication according hereto.
Figure 3A:
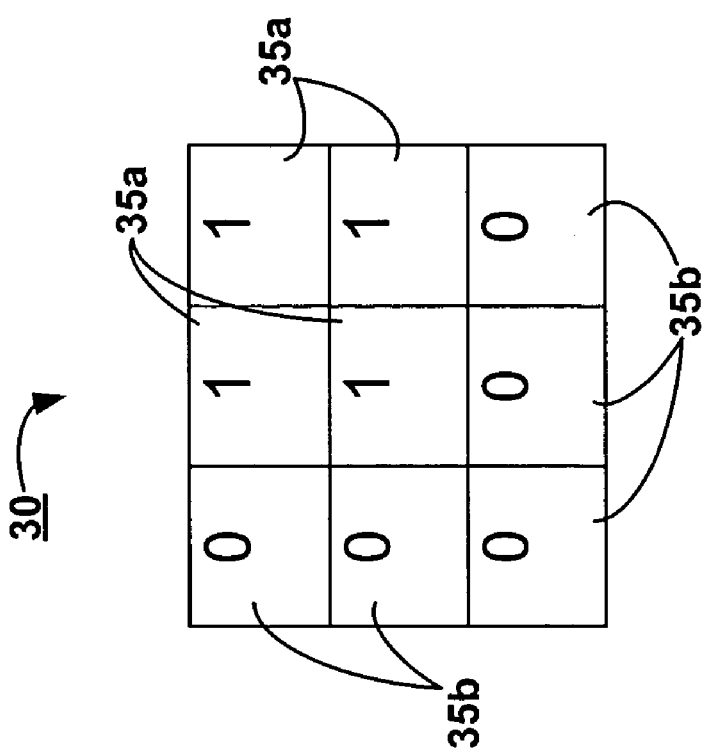

FIG. 3B shows the resultant code with black and white square cells 35*a* (white) and 35*b* (black). Note, FIG. 3 shows only the corner portion of the entire code affected by this change. FIG. 4, on the other hand, shows the entire code(s) with this altered corner incorporated therein. As was the case in FIG. 2, likewise in FIG. 4, the entire code(s) are shown both in human-readable form (see codes 40, 41 and 42 of respective FIGS. 4A, 4B and 4C) and in the corresponding resultant black and white codes (see codes 40*a*, 41*a* and 42*a* of respective FIGS. 4A, 4B and 4C). Then, the respective corner portions 30 and 30*a* are shown as incorporated therein. General data bit modules or cells 45 are also indicated in FIG. 4A; these cells not differing substantially from the cells 25 described generally in FIG. 2 above.

Then as before, the second step of this process is to set the size of the code square. More specifically, the leftmost column 0 is used to record the size of the square. The bit stream "010010 . . . " is written to the border from cell (0,1) to cell (0, n−2). In reading/decoding the code later, the positions of black to white and white to black edges will then be obtainable from the image, thus the size of one module can be determined and then finally the size of the entire code can be calculated. This is shown in FIG. 4 without distinction from the examples in FIG. 2.

The third step is here also as above; namely, the first several bits of the bit stream are recorded in the other three borders of the square with one '0' bit inserted before each two continuous data stream bits, e.g., in a stream of "00 . . . " bits. The bit stream is written continuously to the three borders in order as follows:

The top border from the left cell (1,0) to the right cell (n−4,0);

The right border from the top cell (3,n−1) to bottom cell (n−2,n−1);

The bottom border from the left cell (1,n−1) to the right cell (n−2,n−1).

The only difference of the FIG. 4 examples over the FIG. 2 examples is found in that the borders end more quickly at the intersection with the altered corner 30/30*a*. Thus, fewer actual data stream bits may be written to the borders in the FIG. 4 examples.

Fourth and finally, the remaining data bits from the bit stream or streams to be encoded are written to the modules in the columns from 1 to n−4 from left to right. In each column it is written from top cell (*,1) to bottom cell (*,n−2). Because of the altered corner, for the columns (n−3) and (n−2) the writing of data bits starts from row 3 to row (n−2).

Thus, FIG. 4 presents codes having a size indication and module placement scheme that also gives an indication orientation.

The advantages of the invention can be concluded as following.

In the code design process, determining how to make the code simple and easy to be detected particularly in a blurred image is one of the more (if not the most) important considerations. Thus, it was determined that selecting the geometric square as the basic module shape of code is preferable due to the sampling scheme of optical sensors in the camera imaging chain. Since the sensor arrays of the red, green, blue colours locate on a square lattice, choosing shapes other than square as the module shape will waste resolution, as in, pixel efficiency. Furthermore, since finder patterns are not required for the present codes (conventional image processing algorithms can distinguish the present code area from background), several methods were considered on how to take advantage of the benefits of the location method in a conventional decoder. Using extra lines was, however, found preferable because the thickness of the line is very important to find its edge position in a blurred image. The thicker the line is, the easier and the more accurate position it can provide. So finally the most outside around modules with black colour are used to indicate the position of a code. Actually, it is not needed to set all the most outside modules as black and some information are also recorded in the border. Moreover, using periodic signals (010010010 . . . ) in the most left column makes it easy to measure the size of the code.

Moreover, the present invention provides the invention easily supporting proportional growth of code size, and the payload cost is cheap. Other advantages include being robust for camera readable requirements. Since the image taken by camera phone is substantially always blurred, special finders with fixed shapes might not be easily found and located accurately. The present scheme applies the waveform of periodic signals (the most left column) and does not use any extra symbols with any thinner widths than any module size, therefore the response of the imaging code is stable and can be robustly decoded.

It may also be noted that any higher-level encoding scheme can be performed based on the basic module placement indication of the above-described methodologies (even though the current placement is just bit by bit). Error detection and correction can also be included.

Figure 5:
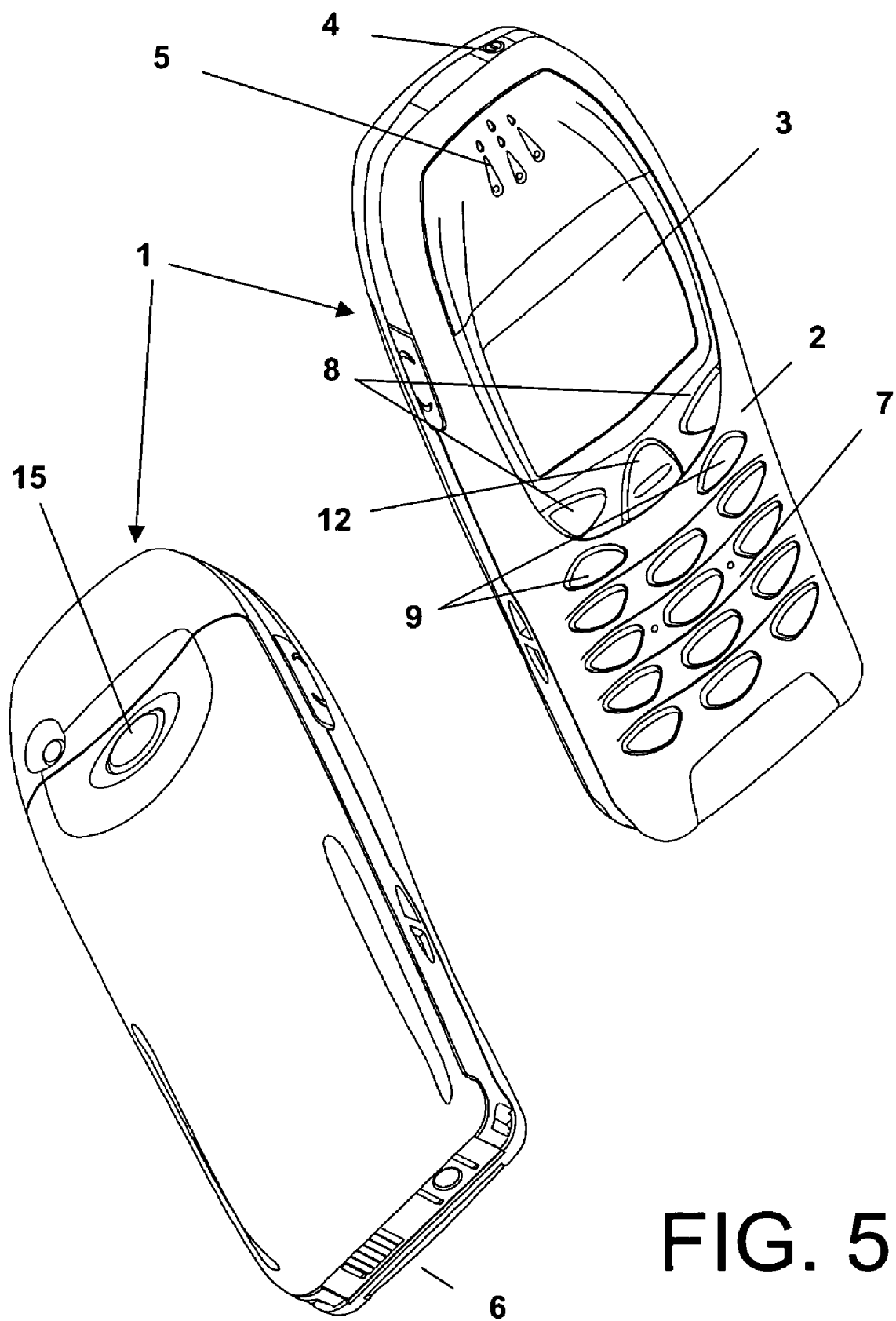
FIG. 5 provides an isometric illustration of an embodiment of a hand portable phone or personal communication terminal which may be used according hereto.

FIG. 5 shows a preferred embodiment of a portable personal communication apparatus in an exemplar form of a mobile or a cellular phone 1, hereafter also alternatively referred to as a handset or a wireless terminal 1, which may be used for standard mobile telephony as well as for alternative functionalities according to the present invention as is described in some detail herein. The wireless terminal 1 comprises a user interface which may include a keypad 2, a display 3, an on/off button 4, a speaker 5 (only structural openings are shown), and a microphone 6 (only structural openings are shown), inter alia. According to an embodiment of the phone, the keypad 2 has a first group 7 of data entry buttons or keys as alphanumeric keys, two softkeys 8, and a scroll-key 12 (up/down and/or right/left and/or any combination thereof) for moving a cursor in the display 3. An alternative hereto may be a four-way button, an eight-way button or a joystick, track ball, roller or other cursor controller (none of which being shown here). Touch screen functionality could also be used. The functionality of the softkeys 8 may be shown in a separate field in the bottom (or other area) of the display 3 just above the softkeys 8. Furthermore the keypad may include one or more, or as shown here, two call-handling keys 9 for initiating and terminating calls, inter alia.

Further shown here is a camera 15 (or at least the lens thereof) to make this a camera phone capable of being used in accordance with the present invention. Note, the camera 15 could alternatively represent another sort of electromagnetic wave scanning/input mechanism (perhaps including infrared, Bluetooth or laser abilities, inter alia). Note, typical mobile camera phones are in actuality net-connected computers with operably incorporated cameras therewithin.

Figure 6:
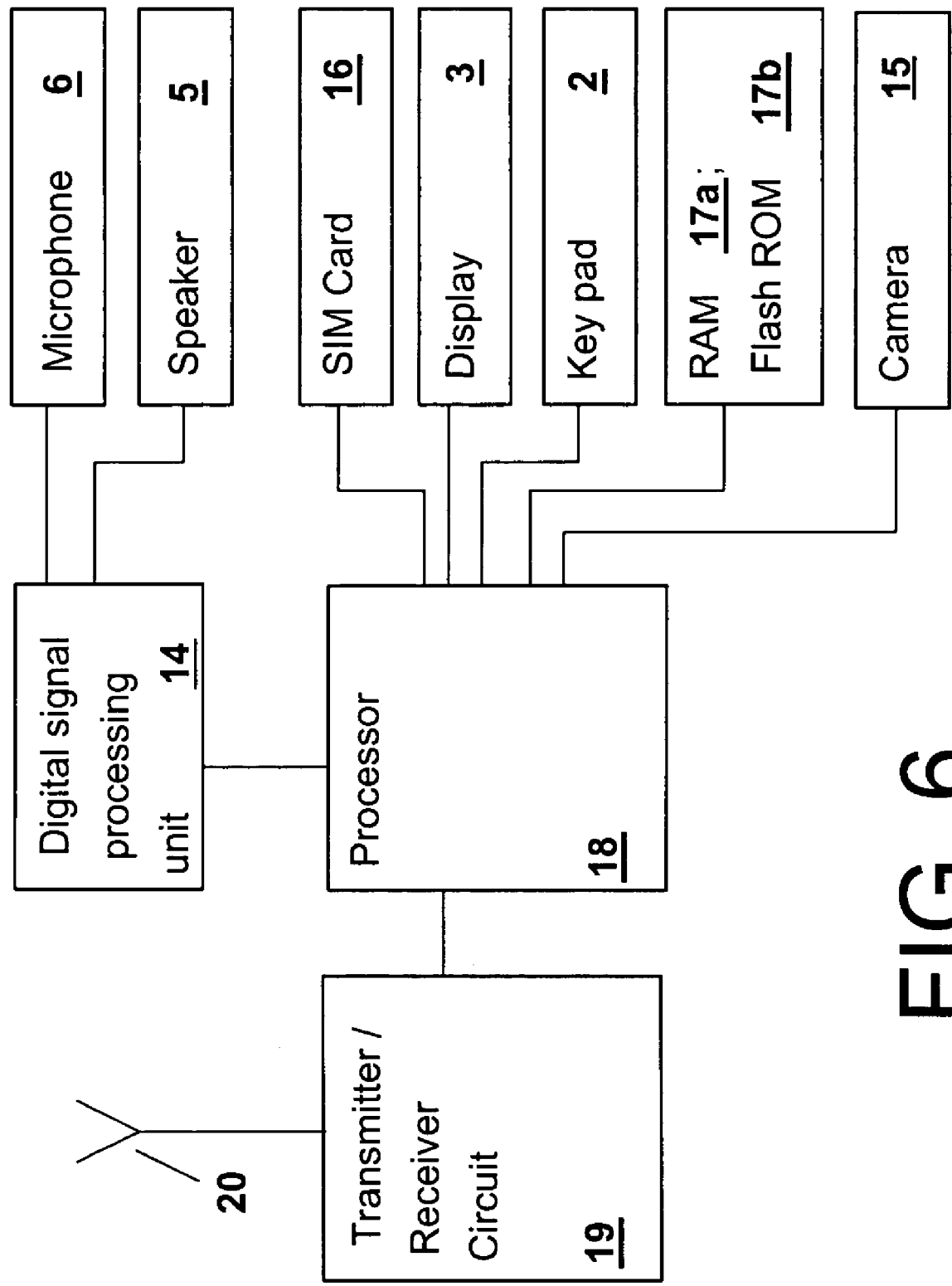
FIG. 6 schematically shows parts of a hand portable phone for operability including internal functionalities as well as communication with a network.

FIG. 6 schematically shows some of the more important parts of a preferred embodiment of a phone 1. A processor 18, which may preferably support GSM terminal software (or alternatives thereto), also controls the communication with a network via a transmitter/receiver circuit 19 and an antenna 20. The microphone 6 receives the user's speech into analogue signals; the signals transmitted thereby are A/D converted in an A/D converter (not separately shown) before the speech is encoded in an audio processing part 14. The encoded speech signal is transferred to the processor 18 which then provides for the encoded speech signal to be communicated via the transmitter/receiver 19 and an antenna 20 to the network and the intended recipient. Going the other way, in receiving an encoded signal from the network via the transmitter/receiver 19, the audio part 14 speech-decodes the signal, which is transferred from the processor 18 to the speaker 5 via a D/A converter (not separately shown).

The processor 18 may also form the interface to the keypad 2 and the display 3, and a SIM card 16, as well as preferably to a RAM memory 17a and/or a Flash ROM memory 17b, and the camera 15 (and other possible devices for data, power supply, etc. (not separately shown)). The memory devices 17a and/or 17b may be used to store software applications and/or the data for use therewith. Particularly as may be applicable to the present invention, such software applications and/or data may include one or more of, inter alia, the software and/or data for a phonebook, address book, call lists containing lists of calls made, received and/or missed; email and/or SMS software and/or email messages, SMS messages sent and/or received, as well as one or more other functionality applications, data, pictures and/or other information, either in the form of one or more stored functional software applications and/or the data related to a particular functionality, as for example, data input via a code scanning operation as described herein above.

Implementation of one or more of such functionalities depends on the capabilities of the particular camera-enabled handset, e.g., phone or personal hand-held computing device. In a basic case, the handset(s) 1 are operable by a user, to control communication functionalities and/or data input and/or output. However, the handset 1 may include a software application for handling data input and/or output as for example, including images received via the camera 15. An Application Program Interface (API) may then handle the connectivity between the program application and he user interface, particularly handling the inputs communicated therethrough and the outputs presented thereto. Note, an API between the program application and the camera may provide the logistics, as for example to control decoding of any codes, inter alia. The API may also control the moving of data to and from the user interface or from the application to another software application or database or even to other communication devices, e.g., to and from other handsets. Other API functionalities on the phone side may include implementation, i.e., accessing and controlling different applications based upon the decoding of the code.

The invention claimed is:

1. A method of operation of a camera-enabled mobile communication or computing device; the method comprising:

providing a code in square form which has been encoded with binary data arrayed within the square form, whereby the code in square form includes at least one border not including binary data, but including code size indication data in the form of a repetitive sequence;

capturing the encoded information using the camera of a camera-enabled mobile communication or computing device;

using the repetitive sequence to determine the size of the code; and decoding the encoded information.

2. A method according to claim 1 wherein the repetitive sequence of the code size indication data is in the repetitive structure of a multiple of a first form of binary values coupled with a number less than the multiple of a second form of binary values.

3. A method according to claim 1 wherein the repetitive sequence of the code size indication data is in the repetitive form of either of two binary values of zero and one binary value of one, or one binary value of zero and two binary values of one.

4. A method according to claim 1 wherein the repetitive sequence of the code size indication data is in the repetitive form of either two black modules and one white module or two white modules and one black module.

5. A method according to claim 1 wherein the repetitive sequence of the code size indication data is in the repetitive form of one or more of "100 . . . "; "0100 . . . "; "1001 . . . "; and "1101 . . . ".

6. A method according to claim 1 wherein the repetitive sequence of the code size indication data defines the at least one border not including binary data of the code square.

7. A method according to claim 1 wherein binary data may be disposed in at least one of the three borders other than the at least one border not including binary data of the code square.

8. A method according to claim 1 wherein the borders of the code square contain at least about one-third modules of one of dark, black or other highly contrasting colours.

9. A method according to claim 1 wherein the three borders other than the at least one border not including binary data of the code square are disposed to contain at least about one-third modules of one of dark, black or other highly contrasting colours.

10. A method according to claim 1 wherein the three borders other than the at least one border not including binary data of the code square are disposed to contain at least about every third module in a repetitive pattern of "000 . . . " as one of dark, black or other highly contrasting colours.

11. A method according to claim 1 wherein the three borders other than the at least one border not including binary data of the code square are disposed to contain at least about every third module in a repetitive pattern of "000 . . . " as one of dark, black or other highly contrasting colours; whereby each represent open modules which will have been filled with encoded bit stream data.

12. A method according to claim 1 wherein the code is arrayed with a predetermined pattern of square modules, wherein the four corners of the code in square form are preset in black form to define the square form of the code.

13. A method according to claim 1 wherein the code is arrayed with a predetermined pattern of square modules, wherein three of the corners of the code in square form are preset in black form to define the square form of the code, and a fourth corner is preset in white form to provide an indication of orientation of the code.

14. A method according to claim 1 wherein the code is arrayed with a predetermined pattern of square modules, wherein three of the corners of the code in square form are preset in black form by single blackened modules to define the square form of the code, and a fourth corner is preset in white form by four white modules to provide an indication of orientation of the code.

15. A method according to claim 1 wherein the code is arrayed with a predetermined pattern of square modules, wherein three of the corners of the code in square form are preset in black form by single blackened modules to define the square form of the code, and a fourth corner is preset in white form by four white modules surrounded on the interior thereof by five preset black modules in an L-shaped configuration to provide an indication of orientation of the code.

16. A method according to claim 1 wherein the code is arrayed with a predetermined pattern of square modules, wherein the interior modules within the borders and corners of the pattern of the code in square form are filled with the binary data of the code.

17. A method according to claim 1 wherein the code is arrayed with a predetermined pattern of equally sized and shaped modules, each module representing a bit of binary data.

18. A method according to claim 1 wherein the code is arrayed with a predetermined pattern of square modules, each square module representing a bit of binary data.

19. A method according to claim 1 wherein the code is arrayed with a predetermined pattern of square modules, each square module representing a bit of binary data; wherein each of the square modules are disposed in either one of two contrasting colours, or in black and white.

20. A method according to claim 1 wherein the code in square form is formed by creation of four corner modules in black colour, by creation of a border including size indication data in a first column of data modules, by filling in modules in the three other borders with alternating one third black modules and two thirds modules coded with data of the code, and by encoding the interior of the square form with binary data of the code arrayed within the square form.

21. A method according to claim 1 wherein the code in square form may have a plurality of classifications definable according to the equation: $n = zk + R$; where n is the size of any column or row of the square, and k is an integer value representative of number of repetitive portions repeat in the repetitive sequence of the at least one border of the square, and z is the number of elements in each repetitive portion of the repetitive sequence, and R is the remainder defining the discrete classifications (+0, +1, +2 . . . up to +(z−1)).

22. A computer readable medium comprising at least computer program code for controlling a camera-enabled mobile communication or computing device; said computer readable medium comprising;

computer code for providing a code in square form which has been encode with binary data arrayed within the square form, whereby the code in square form includes at least one border not including binary data, but including code size indication data in the form of a repetitive sequence;

computer code for capturing the encoded information using the camera of a camera-enabled mobile communication or computing device;

computer code for using the repetitive sequence to determine the size of the code; and computer for decoding the code information.

23. A mobile communication apparatus comprising:
a camera; and
a controller, wherein said controller is configured to:
provide a code in square form which has been encoded with binary data arrayed within the square form, whereby the code in square form includes at least one border not including binary data, but including code size indication data in the form of a repetitive sequence;
capture the encoded information using the camera of a camera-enabled mobile communication or computing device;
use the repetitive sequence to determine the size of the code; and
decode the encoded information.

24. A mobile communication apparatus according to claim 23, wherein the repetitive sequence of the code size indication data is in the repetitive structure of a multiple of a first form of binary values coupled with a number less than the multiple of a second form of binary values.

25. A mobile communication apparatus according to claim 23, wherein the repetitive sequence of the code size indication data is in the repetitive form of either of two binary values of zero and one binary value of one, or one binary value of zero and two binary values of one.

26. A mobile communication apparatus according to claim 23, wherein the repetitive sequence of the code size indication data is in the repetitive form of either two black modules and one white module or two white modules and one black module.

27. A mobile communication apparatus according to claim 23, wherein the repetitive sequence of the code size indication data is in the repetitive form of one or more of "100 . . . "; "0100 . . . "; "1001 . . . "; and "1101 . . . ".

28. A mobile communication apparatus according to claim 23, wherein the repetitive sequence of the code size indication data defines the at least one border not including binary data of the code square.

29. A mobile communication apparatus according to claim 23, wherein binary data may be disposed in at least one of the three borders other than the at least one border not including binary data of the code square.

30. A mobile communication apparatus according to claim 23, wherein the borders of the code square contain at least about one-third modules of one of dark, black or other highly contrasting colors.

31. A mobile communication apparatus according to claim 23, wherein the three borders other than the at least one border not including binary data of the code square are disposed to contain at least about one-third modules of one of dark, black or other highly contrasting colors.

32. A mobile communication apparatus according to claim 23, wherein the three borders other than the at least one border not including binary data of the code square are disposed to contain at least about every third module in a repetitive pattern of "000 . . ." as one of dark, black or other highly contrasting colors.

33. A mobile communication apparatus according to claim 23, wherein the three borders other than the at least one border not including binary data of the code square are disposed to contain at least about every third module in a repetitive pattern of "000 . . ." as one of dark, black or other highly contrasting colors; whereby each represent open modules which will have been filled with encoded bit stream data.

34. A mobile communication apparatus according to claim 23, wherein the code is arrayed with a predetermined pattern of square modules, wherein the four corners of the code in square form are preset in black form to define the square form of the code.

35. A mobile communication apparatus according to claim 23, wherein the code is arrayed with a predetermined pattern of square modules, wherein three of the corners of the code in square form are preset in black form to define the square form of the code, and a fourth corner is preset in white form to provide an indication of orientation of the code.

36. A mobile communication apparatus according to claim 23, wherein the controller is further configured to the code is arrayed with a predetermined pattern of square modules, wherein three of the corners of the code in square form are preset in black form by single blackened modules to define the square form of the code, and a fourth corner is preset in white form by four white modules to provide an indication of orientation of the code.

37. A mobile communication apparatus according to claim 23, wherein the code is arrayed with a predetermined pattern of square modules, wherein three of the corners of the code in square form are preset in black form by single blackened modules to define the square form of the code, and a fourth corner is preset in white form by four white modules surrounded on the interior thereof by five preset black modules in an L-shaped configuration to provide an indication of orientation of the code.

38. A mobile communication apparatus according to claim 23, wherein the code is arrayed with a predetermined pattern of square modules, wherein the interior modules within the borders and corners of the pattern of the code in square form are filled with the binary data of the code.

39. A mobile communication apparatus according to claim 23, wherein the code is arrayed with a predetermined pattern of equally sized and shaped modules, each module representing a bit of binary data.

40. A mobile communication apparatus according to claim 23, wherein the code is arrayed with a predetermined pattern of square modules, each square module representing a bit of binary data.

41. A mobile communication apparatus according to claim 23, wherein the code is arrayed with a predetermined pattern of square modules, each square module representing a bit of binary data; wherein each of the square modules are disposed in either one of two contrasting colors, or in black and white.

42. A mobile communication apparatus according to claim 23, wherein the code in square form is formed by creation of four corner modules in black color, by creation of a border including size indication data in a first column of data modules, by filling in modules in the three other borders with alternating one third black modules and two thirds modules coded with data of the code, and by encoding the interior of the square form with binary data of the code arrayed within the square form.

43. A mobile communication apparatus according to claim 23, wherein the code in square form may have a plurality of classifications definable according to the equation: $n=zk+R$; where n is the size of any column or row of the square, and k is an integer value representative of number of repetitive portions repeat in the repetitive sequence of the at least one border of the square, and z is the number of elements in each repetitive portion of the repetitive sequence, and R is the remainder defining the discrete classifications (+0, +1, +2 . . . up to +(z−1)).

* * * * *